US007330303B2

United States Patent
Sato et al.

(10) Patent No.: US 7,330,303 B2
(45) Date of Patent: Feb. 12, 2008

(54) WAVELENGTH DIVISION MULTIPLEXED OPTICAL AMPLIFIER

(75) Inventors: Takashi Sato, Yokohama (JP); Kazunari Tsubaki, Kawasaki (JP); Tomoaki Takeyama, Kawasaki (JP); Keiko Sasaki, Kawasaki (JP); Shinya Inagaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/804,187

(22) Filed: Mar. 19, 2004

(65) Prior Publication Data

US 2005/0078358 A1 Apr. 14, 2005

(30) Foreign Application Priority Data

Oct. 9, 2003  (JP) .............................. 2003-350938

(51) Int. Cl.
*H01S 4/00* (2006.01)
*H04B 10/12* (2006.01)

(52) U.S. Cl. .............................. 359/341.41; 359/341.32
(58) Field of Classification Search ........... 359/341.41, 359/341.32
See application file for complete search history.

(56) References Cited

U.S. PATENT DOCUMENTS

| 5,521,753 | A  | * | 5/1996  | Fake et al. ............. 359/341.32 |
| 6,055,092 | A  |   | 4/2000  | Sugaya et al. |
| 6,144,486 | A  | * | 11/2000 | Bennett et al. ........ 359/337.13 |
| 6,377,394 | B1 | * | 4/2002  | Drake et al. ........... 359/341.41 |
| 6,426,833 | B1 | * | 7/2002  | Bao ...................... 359/341.32 |
| 6,687,049 | B1 | * | 2/2004  | Sulhoff et al. ........... 359/341.4 |
| 6,690,506 | B2 | * | 2/2004  | Zahnley et al. ........ 359/337.11 |
| 6,943,937 | B2 | * | 9/2005  | Lelic et al. ............ 359/337.11 |
| 2001/0050805 | A1 | * | 12/2001 | Ohshima et al. ......... 359/341.3 |
| 2003/0106990 | A1 |   | 6/2003  | Tomofuji et al. |
| 2004/0197105 | A1 | * | 10/2004 | Khatana et al. ............. 398/173 |

FOREIGN PATENT DOCUMENTS

| EP | 1 318 620 A2 | 6/2003 |
| JP | 8-248455     | 9/1996 |
| JP | 2002-368698  | 12/2002 |
| JP | 2003-174421  | 6/2003 |

* cited by examiner

*Primary Examiner*—Jack Keith
*Assistant Examiner*—Eric Bolda
(74) *Attorney, Agent, or Firm*—Staas & Halsey LLP

(57) ABSTRACT

A wavelength division multiplexed optical amplifier, enabling elimination of the problems of oscillation and fluctuation in output due to ASE at the time of a rapid change in the number of input wavelengths, provided with a first-stage optical amplifying unit, second-stage optical amplifying unit, a common AGC circuit for common AGC of the first and second optical amplifying units, and a pumping light distribution means for applying pumping light to the first and second-stage optical amplifying units with a predetermined distribution ratio.

12 Claims, 10 Drawing Sheets

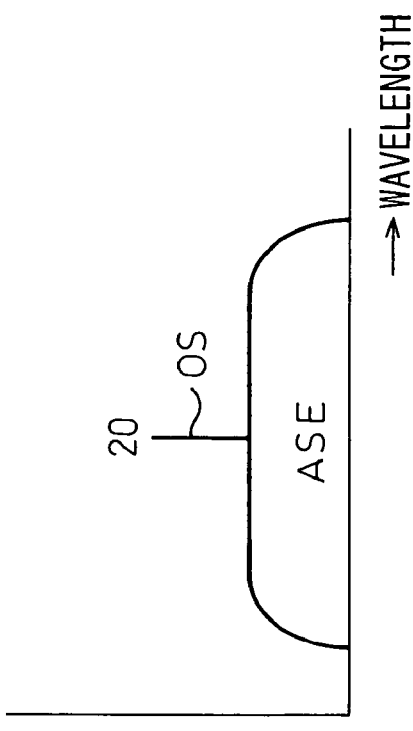
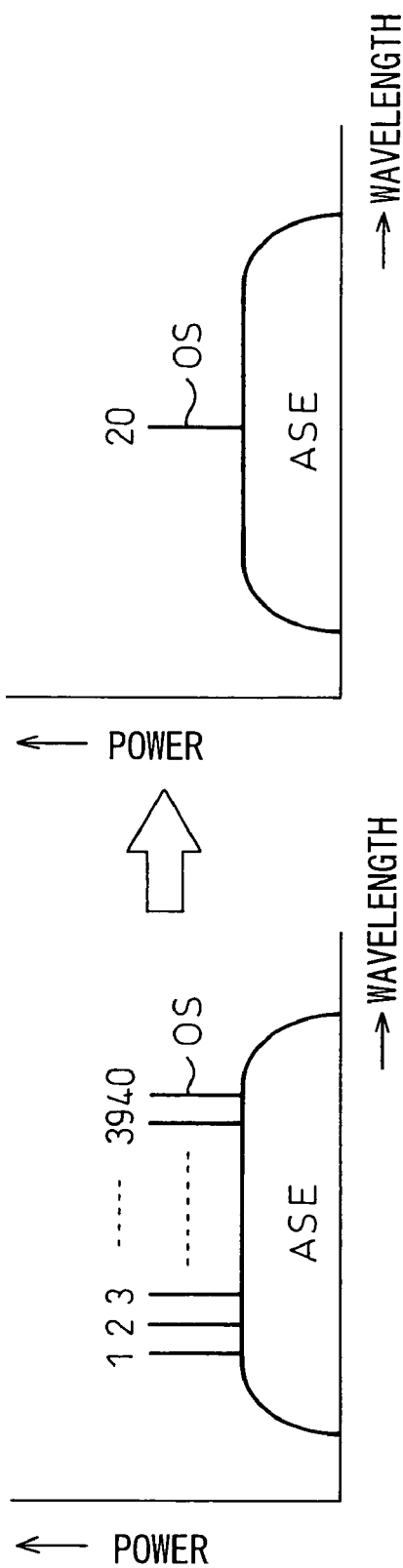

WAVELENGTH DIVISION MULTIPLEXED OPTICAL AMPLIFIER

BACKGROUND OF THE INVENTION

1. Field of the Invention

The present invention relates to a wavelength division multiplexed (WDM) optical amplifier able to be used for an in-line amplifier, pre-amplifier, or post-amplifier in a WDM optical communications network.

2. Description of the Related Art

In recent years, optical communications networks have been demanded to be upgraded to enable higher multimedia services. For this, the amount of information transmitted has been growing rapidly. WDM optical amplifiers (hereinafter sometimes simply referred to as "optical amplifiers") are essential and are broadly used to deal with this. In addition, it is demanded to further improve the optical amplifiers.

With the recent rapid growth in the market for metropolitan networks, further improvements are being sought from optical amplifiers. The main points for improvement are the fluctuation in output due to amplified spontaneous emission (ASE) and oscillation. As will be explained later with reference to the drawings, as general optical amplifiers, extensive use is being made of two-stage configurations comprised of a front-stage optical amplifying unit and a rear-stage optical amplifying unit. Due to this, optical amplifiers free of any wavelength dependency of the gain are being realized.

In such general two-stage configuration optical amplifiers, as explained later with reference to FIG. 1, the front-stage optical amplifying unit individually performs its own front-stage automatic gain control (AGC), while the rear-stage optical amplifying unit individually performs its own rear-stage AGC. Such a front-stage/rear-stage individual AGC type optical amplifier is disclosed for example in Japanese Unexamined Patent Publication (Kokai) No. 8-248455, Japanese Unexamined Patent Publication (Kokai) No. 2002-368698, and Japanese Unexamined Patent Publication (Kokai) No. 2003-174421.

This front-stage/rear-stage individual AGC, however, is not suitable for an optical amplifier for a metropolitan network. The reason is that high speed control is difficult for an optical amplifier operating based on individual two-stage AGC. For example, it is not possible to follow rapid changes in the number of input wavelengths, such as for example a change from 40 wavelengths to one wavelength, which occurs frequently in a metropolitan network.

Therefore, to cope with rapid fluctuations in the number of input wavelengths, recently, two-stage common AGC, instead of the above two-stage individual AGC, has been proposed for two-stage configuration optical amplifiers and has started being put into use. According to this two-stage common AGC type optical amplifier, however, while high speed control can be satisfied, the problems of fluctuation in output due to ASE and oscillation, explained in detail later, end up occurring and require improvement.

SUMMARY OF THE INVENTION

An object of the present invention is to provide a common AGC type WDM optical amplifier able to solve the problems of fluctuation in output due to ASE and oscillation.

To attain the above object, the WDM optical amplifier (3) according to the present invention has a first-stage optical amplifying unit (10), a second-stage optical amplifying unit (20), a common AGC circuit (18) for common AGC of the first- and second-stage optical amplifying units (10, 20), and a pumping light distribution means (30) for applying pumping light to the first- and second-stage optical amplifying units (10, 20) by a predetermined distribution ratio.

BRIEF DESCRIPTION OF THE DRAWINGS

These and other objects and features of the present invention will become clearer from the following description of the preferred embodiments given with reference to the attached drawings, wherein:

FIGS. 11(A) and 11(B) are graphs illustrating the fluctuation in output due to ASE.

DESCRIPTION OF THE PREFERRED EMBODIMENTS

Preferred embodiments of the present invention will be described in detail below while referring to the FIGS. 5 to 12.

The WDM optical amplifier of the present invention is characterized by providing a pumping light distribution means receiving a control signal from a common AGC circuit and applying pumping light to a first-stage optical amplifying unit and second-stage optical amplifying unit with a predetermined distribution ratio.

As will be explained in detail later, it is possible to realize a common AGC type WDM optical amplifier wherein even if the number of input wavelengths of the optical signals rapidly changes, no oscillation will occur and the fluctuation in output due to ASE can be kept small.

To further clarify the effects resulting from the present invention, first, a general WDM optical amplifier will be explained with reference to the drawings.

Figure 1:
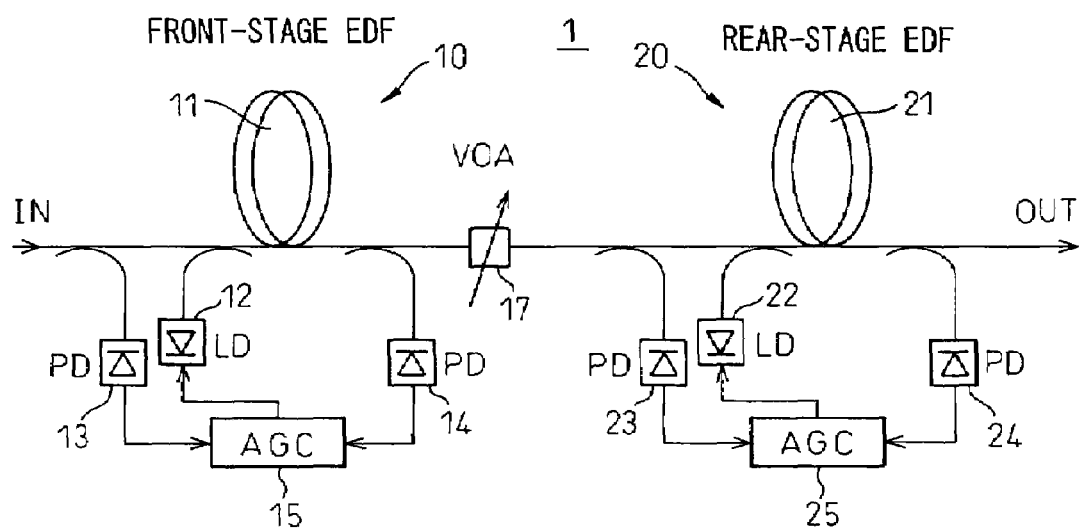
FIG. 1 is a view of the basic configuration of a general two-stage configuration optical amplifier.

FIG. 1 is a view of the basic configuration of a general two-stage configuration optical amplifier.

WDM optical amplifiers having basically the configuration shown in this figure are disclosed in the above-mentioned Japanese Unexamined Patent Publication (Kokai) No.

8-248455, Japanese Unexamined Patent Publication (Kokai) No. 2002-368698, and Japanese Unexamined Patent Publication (Kokai) No. 2003-174421.

In FIG. 1, reference numeral 1 indicates a general WDM optical amplifier. This optical amplifier 1 has a two-stage configuration, that is, is comprised of a front-stage optical amplifying unit 10 and a rear-stage optical amplifying unit 20.

The front-stage optical amplifying unit 10 is comprised of a front-stage rare earth-doped fiber 11 (for example, EDF) and a front-stage pumping light source 12 (for example, LD) and is provided with a front-stage separate AGC loop.

The front-stage individual AGC loop is comprised of an input side photo detector (PD) 13, an output side PD 14, and an AGC circuit 15 receiving as input the output signals from the input side and output side PDs 13 and 14 and performing the AGC of the front-stage optical amplifying unit 10 through the LD 12.

Similarly to the above, the rear-stage optical amplifying unit 20 is also comprised of a rear-stage EDF 21 and a rear-stage LD 22 and is provided with a rear-stage individual AGC loop.

The rear-stage individual AGC loop is also comprised of an input side PD 23, an output side PD 24, and an AGC circuit 25 receiving as input the output signals from the PDs and controlling the rear-stage optical amplifying unit 20 through the LD 22.

Further, the front-stage and rear-stage optical amplifiers 10 and 20 are provided between them with a variable optical attenuator (VOA) 17 in a general configuration.

As shown in FIG. 1, in general, the front-stage and rear-stage optical amplifiers 10 and 20 perform the AGC. By such AGC, it is possible to keep constant the gains of the front-stage and rear-stage optical amplifiers 10 and 20 without regard as to the number of input wavelengths or the magnitude of input dynamic range of the signal applied to the input end (IN) of the front-stage optical amplifying unit 10. Further, by suitably adjusting the loss at the VOA 17, it is possible to maintain flat amplitude-wavelength characteristics of the output optical signal transmitted from the output end (OUT) side of the rear-stage optical amplifying unit 20. The characteristics and operation of the optical amplifier 1 having this configuration will be explained next with reference to FIG. 2 and FIG. 3.

Figure 2:
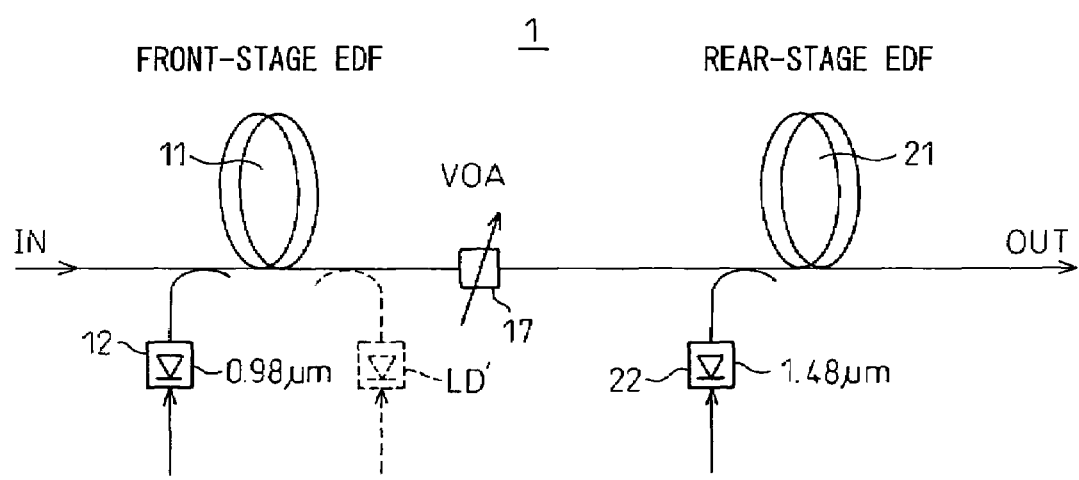
FIG. 2 is a view for explaining the properties of front-stage and rear-stage erbium-doped fibers (EDF) (11, 21) and laser diodes (LDs) (12, 22)

FIG. 2 is a view explaining the characteristics of the front-stage and rear-stage EDF (11 and 21) and LD (12 and 22) in FIG. 1.

Figure 3:
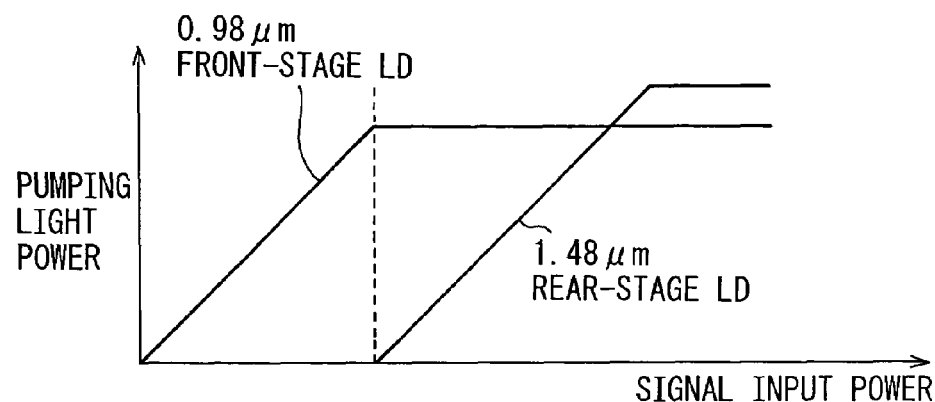
FIG. 3 is a graph showing the drive control of the front-stage and rear-stage LDs (12, 22)

FIG. 3 is a graph of the drive control of the front-stage and rear-stage LDs (12 and 22) in FIG. 1. Note that throughout the figures, similar components are assigned the same reference numerals or symbols.

First, refer to FIG. 2. In the WDM optical amplifier 1, in general, as shown in the figure, much use is made of "forward pumping". This is so as to keep down the noise figure (NF) of the optical amplifier 1 (low NF).

The front-stage EDF 11 contributes greatly to this low NF. As the optimal pumping wavelength for realizing this low NF, 0.98 μm is generally employed. On the other hand, as the pumping wavelength of the rear-stage EDF 21, 1.48 μm is generally employed to optimize the gain efficiency.

The pumping light of the front-stage LD 12 and rear-stage LD 22 having the characteristics explained in FIG. 2 are generally controlled to drive as shown by the graph of FIG. 3. Note that the abscissa of this graph shows the power of the input signal applied to the input end IN of FIG. 1, while the ordinate shows the pumping light power of the front-stage LD 12 and rear-stage LD 22.

As shown in the graph, in general, the pumping light power is increased in the order of the forward pumping (LD 12) of the front-stage EDF 11 and then the forward pumping (LD 22) of the rear-stage EDF 21.

With the general WDM amplifier 1 (FIG. 1 to FIG. 3) explained above, that is, the front-stage/rear-stage individual AGC type optical amplifier 1, as explained above, high speed control is difficult. Therefore, when high speed control is required such as in the WDM optical amplifier for a metropolitan network, use of a common AGC type WDM optical amplifier has been proposed. This is shown in FIG. 4.

Figure 4:
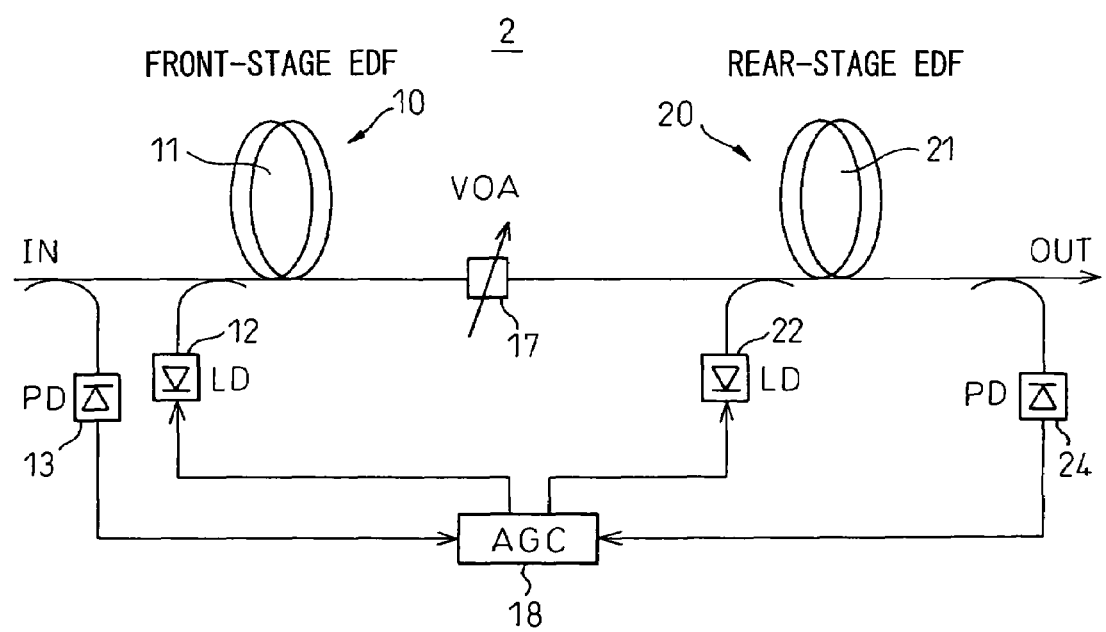
FIG. 4 is a view of the basic configuration of a WDM optical amplifier to which the present invention is applied.

FIG. 4 is a view of the basic configuration of a WDM optical amplifier to which the present invention is applied.

The point to note in the optical amplifier 2 shown in the figure, instead of the front-stage/rear-stage individual AGC circuits 15 and 25 in FIG. 1, a common AGC circuit 18 common to the front-stage and rear-stage optical amplifying units 10 and 20 is introduced. Due to this, it is possible to realize a high speed control optical amplifier able to be used, for example, for a metropolitan network.

However, since individual AGC (FIG. 1) is changed to common AGC (FIG. 2), new problems arise. These are the problem of "fluctuation in output due to ASE" and the problem of "oscillation".

First, consider the former "fluctuation in output due to ASE". When pumping the front-stage EDF 11 and rear-stage EDF 21 by the control method shown in FIG. 3 and performing common AGC in the optical amplifier as a whole as shown in FIG. 4, assume that the maximum number of input wavelengths rapidly decreases from 40 wavelengths to for example one wavelength.

In this case, the gain ratio of the front-stage EDF 11 of pumping (LD 12) of 0.98 μm becomes larger, while the gain ratio of the rear-stage EDF 21 of pumping (LD 22) of 1.48 μm becomes smaller. This being the case, the fluctuation, due to the rapid decrease in the number of wavelengths with respect to the ASE which is in the wavelength band of the short wavelength side of the wavelength band of the signal generated from the rear-stage EDF 21, in the final analysis appears as large output fluctuation of the optical signal at the output end OUT. Note that this phenomenon appears remarkably in the L-band region.

The output fluctuation of the optical signal (OUT) naturally has to be suppressed in order to achieve the desired performance of the optical amplifier 2, but when trying to suppress this output fluctuation, the problem of oscillation occurs. This will be explained in further detail below.

The first method considered for suppressing this fluctuation of output is pumping by for example a pumping wavelength of 1.48 μm from the rear of the front-stage EDF 11 (see LD' of broken line in FIG. 2) and use of forward and backward pumping at the front-stage EDF 11 to increase the gain of the front-stage EDF 11 and decrease the gain of the front-stage EDF 21 by this amount.

By this method, however, if controlling the drive as shown in FIG. 3, since the pumping light power does not change at the time of a rapid decrease of the input wavelengths of for example a reduction from 40 wavelengths to one wavelength, the gain of the front-stage EDF 11 ends up becoming too large. Due to the excessive gain, oscillation ends up occurring between the front-stage EDF 11 and the surrounding optical components, for example, an optical isolator. This is the problem of oscillation explained above.

Therefore, the present invention provides a WDM optical amplifier (3, 4, 5, 6, 7-1, and 7-2) explained below.

The specific thinking of the present invention is suppression of the "fluctuation of output due to ASE" and prevention of "oscillation" by realizing both backward pumping (LD') for the front-stage EDF 11 and forward pumping (22) for the backward EDF 22 and by setting the pumping ratio of the two at predetermined values in accordance with the input level of the input signal and other conditions. More specifically, the pumping ratio is made a value able to give, to the front-stage EDF 11, a backward pumping light power, the magnitude of which is able to achieve the above low NF while preventing the occurrence of oscillation at the front-stage EDF 11.

Figure 5:
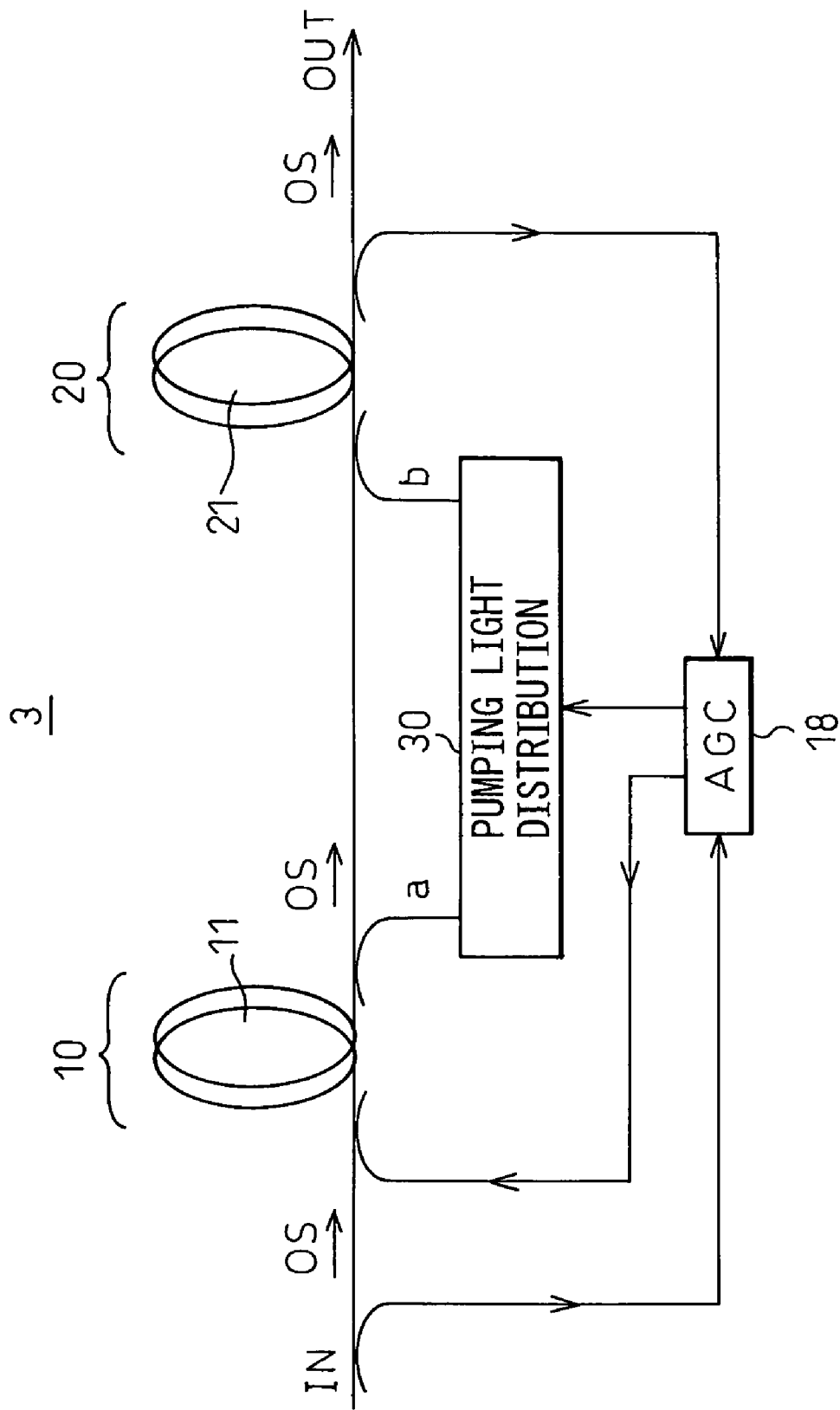
FIG. 5 is a view of the basic configuration of a WDM optical amplifier according to the present invention.

FIG. 5 is a view of the basic configuration of the WDM optical amplifier according to the present invention.

The WDM optical amplifier 3 shown in the figure, like the WDM optical amplifier 2 shown in FIG. 4, is comprised of a first-stage optical amplifying unit 10 and second-stage optical amplifying unit 20 arranged in series with respect to the optical signal OS and a common AGC circuit 18 for AGC by the optical signals at the input end IN and output end OUT of the first- and second-stage optical amplifying units 10 and 20.

Here, the present invention is characterized by the introduction of the pumping light distribution means 30. The pumping light distribution means 30 receives a control signal from the common AGC circuit 18 and applies the pumping light to the first-stage optical amplifying unit 10 and second-stage optical amplifying unit 20 with a predetermined distribution ratio (a:b).

The basic configuration of the present invention shown in FIG. 5 is embodied in the first embodiment, second embodiment, third embodiment, etc. shown below.

First Embodiment

Figure 6:
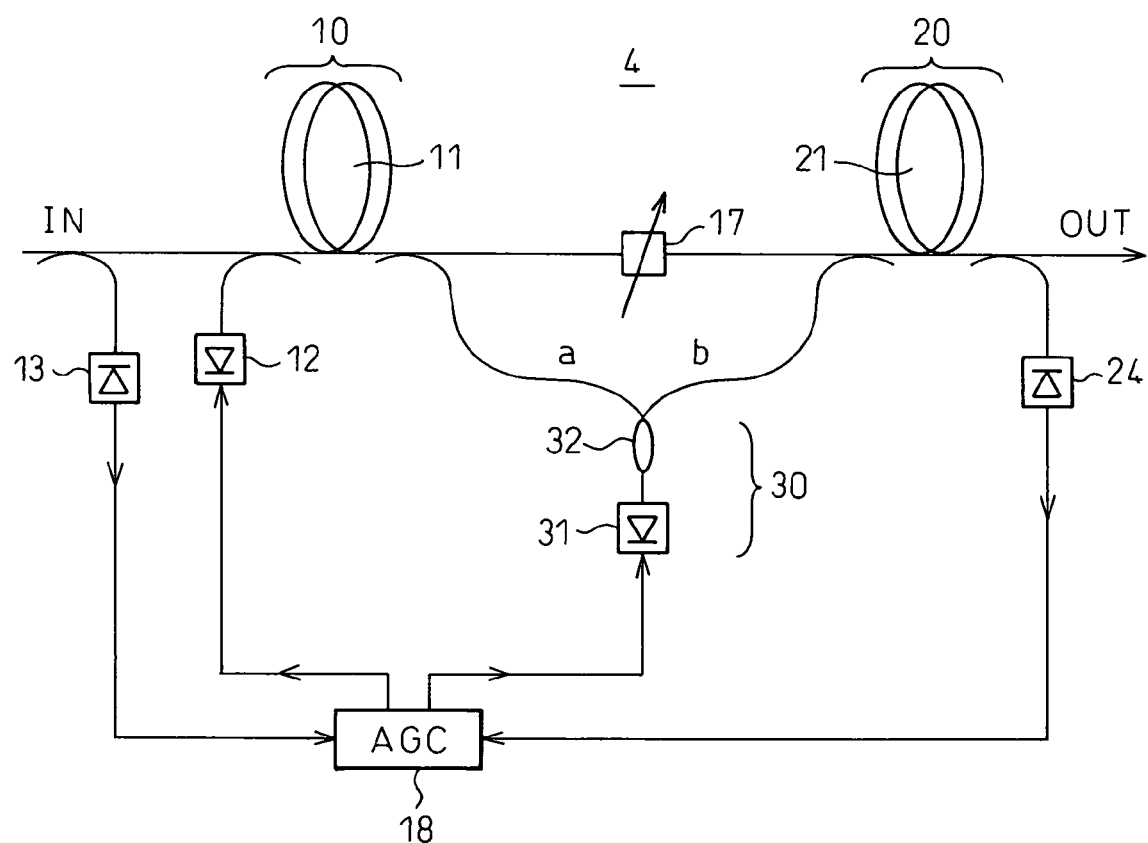
FIG. 6 is a view of the configuration of a WDM optical amplifier according to a first embodiment of the present invention.

FIG. 6 is a view of a WDM optical amplifier according to a first embodiment of the present invention. Note that throughout the figures, the same components are assigned the same reference numerals or symbols.

The WDM optical amplifying unit 4 according to the first embodiment realizes the pumping light distribution means 30 using an optical coupler.

That is, as shown in FIG. 6, the pumping light distribution means 30 in the first embodiment is comprised of a single pumping light source (LD) 31 and an optical coupler 32 for splitting the pumping light from the single pumping light source 31 with a predetermined distribution ratio a:b and applying the results to the first-stage optical amplifying unit 10 and second-stage optical amplifying unit 20. Note that the components assigned the reference numerals 11, 12, 13, 17, 21, and 24 are shown in FIG. 4.

Second Embodiment

Figure 7:
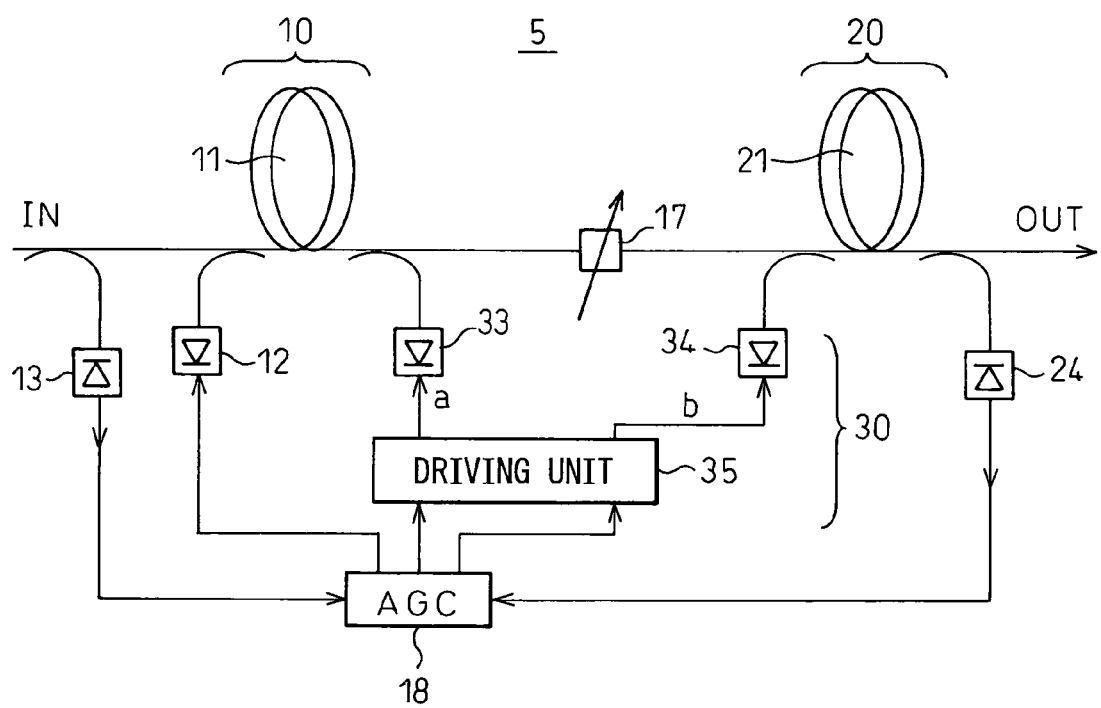
FIG. 7 is a view of the configuration of a WDM optical amplifier according to a second embodiment of the present invention.

FIG. 7 is a view of a WDM optical amplifier according to a second embodiment of the present invention.

The WDM optical amplifier 5 of the second embodiment realizes the pumping light distribution means 30 using individual pumping light sources and driving units for individually driving these pumping light sources.

That is, as shown in FIG. 7, the pumping light distribution means 30 in the second embodiment is comprised of a first pumping light source 33 for pumping the first-stage optical amplifying unit 10, a second pumping light source 34 for pumping the second-stage optical amplifying unit 20, and a driving unit 35 for driving the first and second pumping light sources 33 and 34 so as to match the predetermined distribution ratio (a:b).

Third Embodiment

Figure 8:
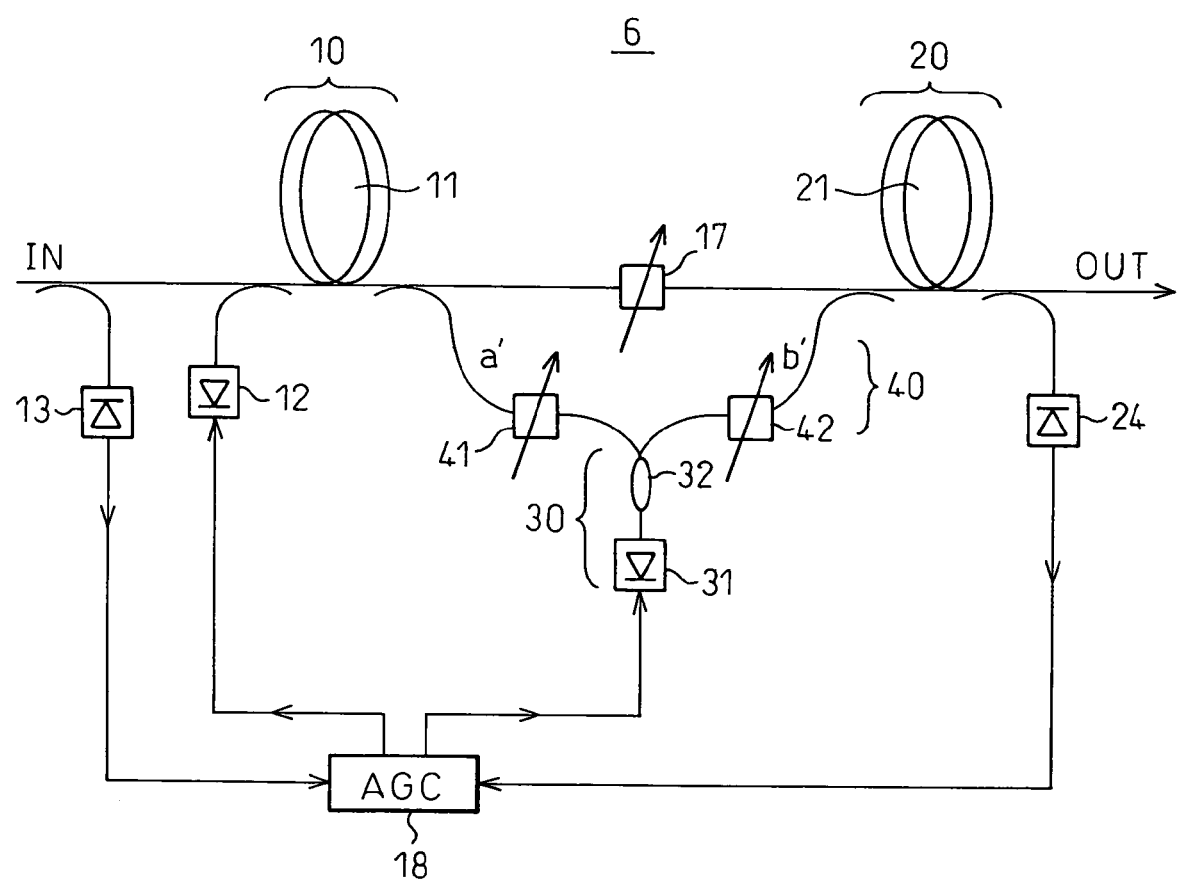
FIG. 8 is a view of the configuration of a WDM optical amplifier according to a third embodiment of the present invention.

FIG. 8 is a view of a WDM optical amplifier according to a third embodiment of the present invention.

The WDM optical amplifying 6 according to the third embodiment is further provided with a distribution ratio control means 40 able to change the predetermined distribution ratio (a:b) (to a':b').

This distribution ratio control means 40 can be applied to either the first embodiment (FIG. 6) or the second embodiment (FIG. 7), but FIG. 8 shows the case of application to the first embodiment. As a specific example of the distribution ratio control means 40, FIG. 8 shows the case of use of a first optical attenuator 41 and second optical attenuator 42 able to change the intensity of the pumping light.

4-1st Embodiment

The 4-1st embodiment and the later mentioned 4-2nd embodiment are modifications able to be applied to any one of the first, second, and third embodiments. They provide at least three stages of optical amplifying units including an "additional optical amplifying unit" arranged in series with the optical signal and use two of these optical amplifying units as the first-stage optical amplifying unit and second-stage optical amplifying unit.

Figure 9:
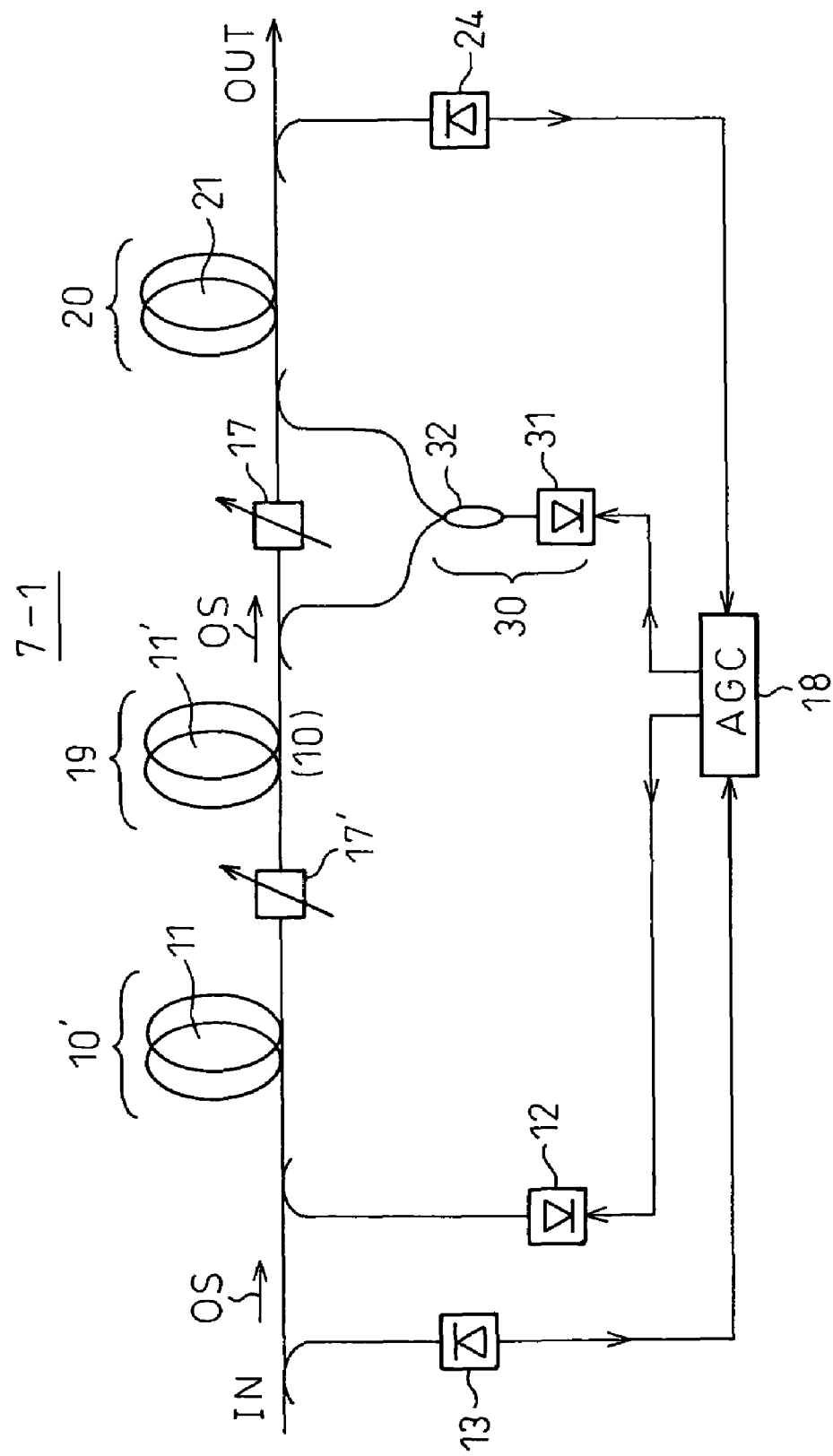
FIG. 9 is a view of the configuration of a WDM optical amplifier according to a 4-1st embodiment of the present invention.

FIG. 9 is a view of a WDM optical amplifier 7-1 according to a 4-1st embodiment of the present invention. This "additional optical amplifying unit" is the middle-stage optical amplifying unit 19 in FIG. 9. The optical amplifier 7-1 comprises, including the middle-stage optical amplifying unit 19, the three-stage configuration of the optical amplifying units 10', 19, and 20. Similarly, this may be made a four-stage or higher configuration, but this is not illustrated.

In the case of FIG. 9, the middle-stage optical amplifying unit 19 acts as the first-stage optical amplifying unit 10 shown in FIG. 5 to FIG. 8. This optical amplifying unit 19 is comprised of a middle-stage EDF 11'. Further, a VOA 17' similar to the above-mentioned VOA is added.

4-2nd Embodiment

Figure 10:
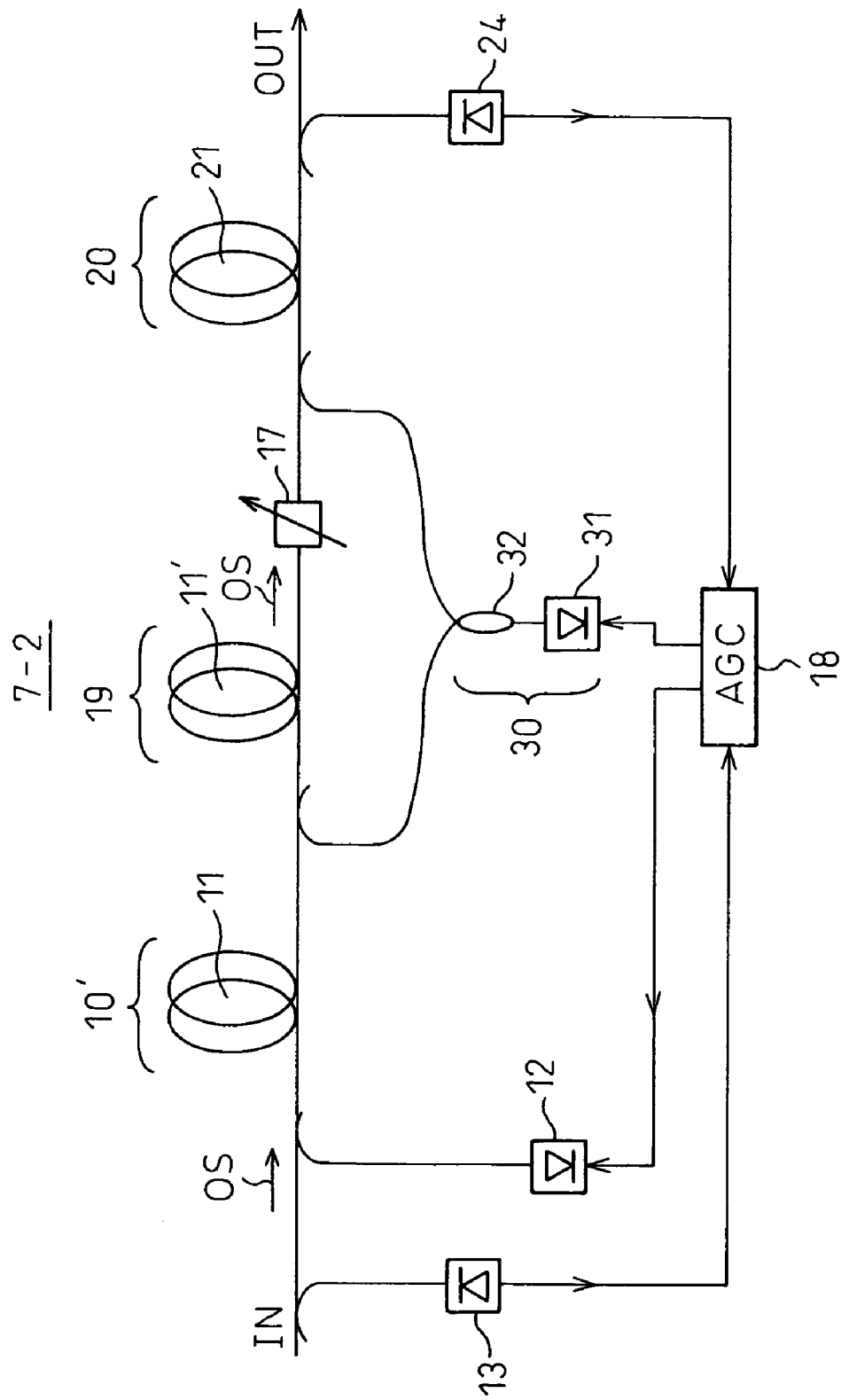
FIG. 10 is a view of the configuration of a WDM optical amplifier according to a 4-2nd embodiment of the present invention.

The 4-2nd embodiment of FIG. 10 is a modification of the 4-1st embodiment (FIG. 9). That is, the middle-stage optical amplifying unit 19 (10) of FIG. 9 is made a forward pumping type. This corresponds to the embodiment of FIG. 9 minus the VOA 17'.

Next, specific examples of the above embodiments will be given below.

As is well known, the modes of pumping of rare earth-doped fiber (11, 11', 21) include forward pumping, backward pumping, and forward and backward pumping, but the preferable mode of pumping of the present invention is as follows: AS shown in the first embodiment (FIG. 6) and the second embodiment (FIG. 7), forward and backward pumping is performed by adding backward pumping from the pumping light distribution means 30 for the first-stage optical amplifying unit 10, while the pumping light distribution means 30 performs forward pumping for the second-stage optical amplifying unit 20.

In this case, as the backward pumping light (a) and the forward pumping light (b) from the pumping light distribution means 30, the wavelength 1.48 μm is selected, while 0.98 μm is preferably selected as the wavelength of the forward pumping light (12) to the fiber 11. Therefore, forward and backward pumping becomes pumping by the wavelength 0.98 μm and the wavelength 1.48 μm.

The "predetermined distribution ratio" (a:b) of the backward pumping light (a) and forward pumping light (b) was explained in detail above, but will be redefined next.

(i) The predetermined distribution ratio (a:b) is a value able to obtain a gain increased up to near the upper limit where oscillation occurs in the first-stage optical amplifying unit 10 so as to obtain a low noise figure (NF).

(ii) Further, the predetermined distribution ratio (a:b) is the value able to suppress fluctuation of output at the output end OUT due to ASE when the number of input wavelengths of the optical signal OS received at the input end IN rapidly decreases. This will be examined in some more detail with reference to the drawings.

FIGS. 11(A) and 11(B) are graphs illustrating fluctuation in output due to ASE. The graphs of FIGS. 11(A) and 11(B) show the wavelength of light input along the abscissa and the power of the light along the ordinate.

The graph of FIG. 11(A) shows the case of processing 40 wavelengths (1, 2, 3 . . . 39, 40) as optical signals. Here, assume that the optical signal OS is rapidly reduced from 40 wavelengths to one wavelength (for example, 20). This is shown by the graph of FIG. 11(B).

On the other hand, looking at the ASEs of the graphs of FIGS. 11(A) and 11(B), the amount of ASE corresponds substantially to the pumping light, so even if there is a large fluctuation in the optical signal (40→1), the pumping light remains almost constant in power, so the ASE does not change between FIGS. 11(A) and 11(B).

This being the case, the amount of the ASE relative to the optical signal OS increases greatly when shifting from FIG. 11(A) to FIG. 11(B). This appears as the above fluctuation of output.

Therefore, the predetermined distribution ratio (a:b) has to satisfy at least one of the values of (i) and (ii), but preferably is a value satisfying both of (i) and (ii). Note that in the detailed example of the invention described later, a:b=1:20.

Further, in the above explanation, the example was taken of a rare earth-doped fiber (EDF) as the optical amplifying medium forming the amplifying units (10, 19, and 20), but the invention is not limited to this and may also be applied to an optical waveguide.

Finally, a detailed example of the present invention will be shown in the figures.

Figure 12:
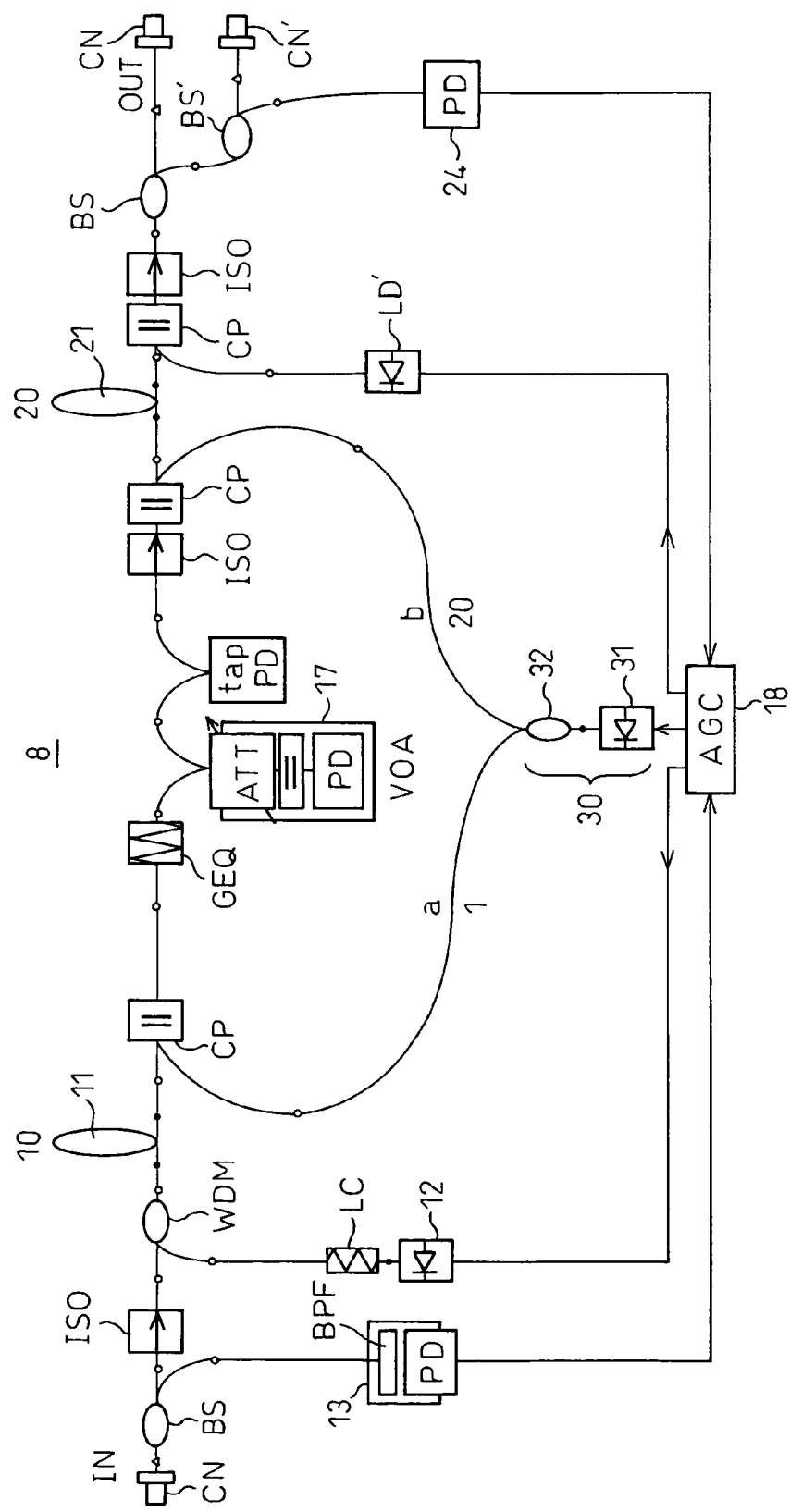
FIG. 12 is a view of a detailed example of a WDM optical amplifier according to the present invention.

FIG. 12 is a view of a detailed example of a WDM amplifier according to the present invention.

The WDM amplifier 8 of this figure is based on the configuration of FIG. 6. Components in FIG. 12 corresponding to the components shown in FIG. 6 are assigned the same reference numerals or symbols. "CN" at the left end of FIG. 12 is an optical connector. The optical signal is input from there. The input optical signal is split into two by the beam splitter BS and applied to the isolator ISO and BPF-equipped input side photo detector (PD) 13.

The signal light from the isolator ISO passes through the WDM coupler and is input to the optical amplifying unit 10. The pumping light from the front-stage pumping light source (LD) 12 is applied through the WDM to the optical amplifying unit 10. This LD 12 is provided with a wavelength lock LC.

The optical signal from the optical amplifier 10 passes through the coupler CP and reaches the VOA 17. The split pumping light (a) from the optical coupler 32 passes through the coupler CP where the existing backward pumping is performed with respect to the amplifier 10.

The optical signal passed through this coupler CP passes through the gain equalizer GEQ and reaches the VOA 17. Further, it passes through the tap PD and reaches the isolator ISO and coupler CP and is input to the optical amplifier 20. The split pumping light (b) from the optical coupler 32 passes through the coupler CP and performs the above forward pumping to the optical amplifier 20. Note that the optical amplifier 20 of the figure performs backward pumping by the LD' through the output side coupler CP, but this is not relevant to the present invention.

The output optical signal from the optical amplifying unit 20 is output from the output end (OUT) side optical connector CN (output port) through the beam splitter BS and on the other hand is output to the beam splitter BS'.

The optical signal passed through this beam splitter BS' is on the one hand guided to a monitor use connector CN' and is on the other hand guided to the above-mentioned output side photo detector (PD) 24.

Summarizing the effects of the invention, the invention can be applied to the full spectrum of WDM optical amplifiers required to follow at a high speed and amplify input light accompanied with frequent fluctuations in the number of input wavelengths.

While the invention has been described with reference to specific embodiments chosen for purpose of illustration, it should be apparent that numerous modifications could be made thereto by those skilled in the art without departing from the basic concept and scope of the invention.

What is claimed is:

1. A wavelength division multiplexed optical amplifier comprising:
    a first-stage optical amplifying unit and a second-stage optical amplifying unit arranged in series with respect to an optical signal, where a first pumping light is supplied to said first-stage optical amplifying unit at an input side of said first-stage optical amplifying unit, a second pumping light is supplied to the first-stage optical amplifying unit at an output side of said first-stage optical amplifying unit, and a third pumping light is supplied to said second-stage optical amplifying unit at an input side of said second-stage optical amplifying unit,
    a common automatic gain control circuit
        performing automatic gain control in accordance with the optical signal at the input side of the first-stage optical amplifying unit and the optical signal at an output side of said second-stage optical amplifying unit,
        producing a first control signal for controlling the first pumping light, and
        producing a second control signal for commonly controlling both the second pumping light and the third pumping light, and
    a pumping light distribution function unit receiving the second control signal from said common automatic gain control circuit and, in accordance with the received second control signal, supplying said second pumping light to the first-stage optical amplifying unit at the output side of the first-stage amplifying unit and said third pumping light to the second-stage optical amplifying unit at the input side of the second-stage optical amplifying unit with a predetermined distribution ratio of a:b (a<b) in their levels, which ratio is constant at any level of said first pumping light.

2. An optical amplifier as set forth in claim 1, wherein said pumping light distribution function unit comprises:
  a single pumping light source, and
  an optical coupler for splitting pumping light from said single pumping light source with the predetermined distribution ratio into said second pumping light and said third pumping light, and supplying said second pumping light and said third pumping light to said first-stage optical amplifying unit and said second-stage optical amplifying unit, respectively.

3. An optical amplifier as set forth in claim 1, wherein said pumping light distribution function unit comprises:
  a first pumping light source providing said second pumping light,
  a second pumping light source providing said third pumping light, and
  a driving unit driving said first and second pumping light sources to match said predetermined distribution ratio.

4. An optical amplifier as set forth in claim 1, wherein said optical amplifier is provided with at least three stages of optical amplifying units including an additional optical amplifying unit arranged in series with said optical signal, and two of said optical amplifying units are made to be said first-stage optical amplifying unit and said second-stage optical amplifying unit.

5. An optical amplifier as set forth in claim 1, further comprising:
  a distribution ratio control function unit able to change said predetermined distribution ratio.

6. An optical amplifier as set forth in claim 5, wherein said distribution ratio control function unit is an optical attenuator able to change an intensity of at least one of said second pumping light and said third pumping light.

7. An optical amplifier as set forth in claim 1, wherein
  said first-stage optical amplifying unit comprises an optical amplifying medium through which the second pumping light travels to thereby amplify the optical signal as the optical signal travels through said optical amplifying medium, said optical amplifying medium of said first-stage optical amplifying unit being a rare earth-doped fiber or an optical waveguide, and
  said second-stage optical amplifying unit comprises an optical amplifying medium through which the third pumping light travels to thereby amplify the optical signal as the optical signal travels through said optical amplifying medium, said optical amplifying medium of said second-stage optical amplifying unit being a rare earth-doped fiber or an optical waveguide.

8. An optical amplifier as set forth in claim 4, wherein
  said first-stage optical amplifying unit comprises an optical amplifying medium through which the second pumping light travels to thereby amplify the optical signal as the optical signal travels through said optical amplifying medium, said optical amplifying medium of said first-stage optical amplifying unit being a rare earth-doped fiber or an optical waveguide, and
  said second-stage optical amplifying unit comprises an optical amplifying medium through which the third pumping light travels to thereby amplify the optical signal as the optical signal travels through said optical amplifying medium, said optical amplifying medium of said second-stage optical amplifying unit being a rare earth-doped fiber or an optical waveguide.

9. An optical amplifier as set forth in claim 1, wherein said predetermined distribution ratio is made a value giving a gain increased near an upper limit where oscillation occurs in said first-stage optical amplifying unit so as to obtain a low noise figure.

10. An optical amplifier as set forth in claim 1, wherein said predetermined distribution ratio is made a value enabling fluctuation of output at the output side of the second-stage optical amplifying unit due to amplified spontaneous emission (ASE) to be suppressed when a number of input wavelengths of the optical signal received at the input side of the first-stage optical amplifying unit rapidly decreases.

11. An optical amplifier comprising:
  a first-stage optical amplifying unit supplied with a first pumping light to an input side of the first-stage optical amplifying unit and a second pumping light to an output side of the first-stage optical amplifying unit, receiving a wavelength division multiplexed (WDM) optical signal at the input side, and amplifying the received WDM optical signal in accordance with the supplied first and second pumping lights to thereby output a first-stage amplified WDM optical signal;
  a second-stage optical amplifying unit supplied with a third pumping light to an input side of the second-stage optical amplifying unit, receiving the first-stage amplified WDM optical signal at the input side of the second-stage optical amplifying unit, and amplifying the received first-stage amplified WDM optical signal in accordance with the supplied third pumping light to thereby output a second-stage amplified WDM optical signal at an output side of the second-stage optical amplifying unit;
  a common automatic gain control circuit producing first and second control signals in accordance with power level of the WDM optical signal at the input side of the first-stage optical amplifying unit and power level of the second-stage amplified WDM optical signal at the output side of the second-stage optical amplifying unit, wherein the first control signal is used to control the first pumping light supplied to the first-stage optical amplifying unit; and
  a pumping light distribution function unit, in accordance with the second control signal, supplying the second pumping light to the first-stage optical amplifying unit and the third pumping light to the second-stage optical amplifying unit with a predetermined distribution ratio of a:b (a<b) in their levels, which ratio is constant at any level of the first pumping light, wherein the first and second control signals thereby cause gain of the optical amplifier to be automatically controlled.

12. An optical amplifier comprising:
  a first-stage optical amplifying unit supplied with a first pumping light to an input side of the first-stage optical amplifying unit and a second pumping light to an output side of the first-stage optical amplifying unit, receiving a wavelength division multiplexed (WDM) optical signal at the input side, and amplifying the received WDM optical signal in accordance with the supplied first and second pumping lights to thereby output a first-stage amplified WDM optical signal;
  a second-stage optical amplifying unit supplied with a third pumping light to an input side of the second-stage optical amplifying unit, receiving the first-stage amplified WDM optical signal at the input side of the second-stage optical amplifying unit, and amplifying the received first-stage amplified WDM optical signal in accordance with the supplied third pumping light to thereby output a second-stage amplified WDM optical signal at an output side of the second-stage optical amplifying unit;

means for producing first and second control signals in accordance with power level of the WDM optical signal at the input side of the first-stage amplifying unit and power level of the second-stage amplified WDM optical signal at the output side of the second-stage optical amplifying unit, wherein the first control signal is used to control the first pumping light supplied to the first-stage optical amplifying unit; and means, in accordance with the second control signal, for supplying the second pumping light to the first-stage optical amplifying unit and the third pumping light to the second-stage optical amplifying unit with a predetermined distribution ratio of a:b (a<b) in their levels, which ratio is constant at any level of the first pumping light, wherein the first and second control signals thereby cause gain of the optical amplifier to be automatically controlled.

* * * * *